United States Patent [19]

Christiansen et al.

[11] Patent Number: 4,493,812
[45] Date of Patent: Jan. 15, 1985

[54] NUCLEAR RADIATION ACTUATED VALVE

[75] Inventors: David W. Christiansen, Kennewick; Dixon P. Schively, Richland, both of Wash.

[73] Assignee: The United States of America as represented by the United States Department of Energy, Washington, D.C.

[21] Appl. No.: 340,621

[22] Filed: Jan. 19, 1982

[51] Int. Cl.³ .............................................. G21C 7/32
[52] U.S. Cl. .................................... 376/352; 376/175
[58] Field of Search ............... 376/175, 352, 176, 365; 251/11, 369; 137/90, 79, 78.1

[56] References Cited

U.S. PATENT DOCUMENTS

| | | | |
|---|---|---|---|
| 3,486,973 | 12/1969 | Georges et al. | 376/175 |
| 3,763,886 | 10/1973 | Lambert | 376/352 |
| 4,050,985 | 9/1977 | Yant et al. | 376/175 |
| 4,118,275 | 10/1978 | Carleton et al. | 376/352 |
| 4,125,221 | 11/1978 | Carlson | 236/93 R |
| 4,202,726 | 5/1980 | Duncombe et al. | 376/175 |
| 4,225,387 | 9/1980 | Gatley | 376/175 |
| 4,313,794 | 2/1982 | Chung | 376/352 |
| 4,431,603 | 2/1984 | Hecht | 376/352 |

FOREIGN PATENT DOCUMENTS 51-99797  9/1976  Japan .................................. 376/352

Primary Examiner—Sal Cangialosi
Attorney, Agent, or Firm—Edward W. Nypaver; Richard E. Constant

[57] ABSTRACT

A nuclear radiation actuated valve for a nuclear reactor. The valve has a valve first part (such as a valve rod with piston) and a valve second part (such as a valve tube surrounding the valve rod, with the valve tube having side slots surrounding the piston). Both valve parts have known nuclear radiation swelling characteristics. The valve's first part is positioned to receive nuclear radiation from the nuclear reactor's fuel region. The valve's second part is positioned so that its nuclear radiation induced swelling is different from that of the valve's first part. The valve's second part also is positioned so that the valve's first and second parts create a valve orifice which changes in size due to the different nuclear radiation caused swelling of the valve's first part compared to the valve's second part. The valve may be used in a nuclear reactor's core coolant system.

8 Claims, 1 Drawing Figure

NUCLEAR RADIATION ACTUATED VALVE

The United States Government has rights in this invention pursuant to Contract No. EY-77-C-14-2170 between the U.S. Department of Energy and the Westinghouse Hanford Company.

BACKGROUND OF THE INVENTION

The present invention relates generally to a nuclear reactor valve and more particularly to a breeder reactor blanket fuel assembly coolant system valve which increases coolant flow to the blanket fuel assembly to minimize long-term temperature increases caused by fission of fissile fuel created from fertile fuel through operation of the breeder reactor.

Valves may be used for many applications in nuclear reactors. Currently an important use of valves is in the nuclear reactor coolant system. However, no self-actuating valves are presently used to control coolant flow to each of the many fuel assemblies which form the core of the reactor. The present state-of-the-art uses a fixed-size orifice in each fuel assembly to provide the entrance for coolant flow to the fuel rods contained therein, and use of a check valve to prevent reverse flow has been considered.

In certain circumstances, varying the size of each fuel assembly coolant entrance orifice may be desirable. For example, in breeder reactors the blanket fuel assemblies experience a long-term increase in temperature due to fuel rod power increase caused by an increase in fissile fuel content. This is brought about by the breeder reactor's operation in converting the blanket fuel assemblies' fertile fuel into fissile fuel. The long-term temperature increase may be different for each fuel assembly. Blanket fuel assemblies are designed to operate within a certain temperature range. Higher temperatures will degrade the fuel assembly by shortening material life. Lower temperatures will degrade the reactor's performance by lowering its power for a given coolant flow. Thus, the inherent problem of breeder reactor blanket assemblies is that, with a fixed-size coolant entrance orifice, beginning-of-life temperatures are too low with acceptable end-of-life temperatures, or end-of-life temperatures are too high with acceptable beginning-of-life temperatures. A size-varying orifice valve could increase coolant flow to the blanket fuel assembly to keep long-term temperature increases to a minimum.

Another example where a size-varying fuel assembly coolant entrance orifice may be desirable is in a fissile fuel assembly designed for long life, where the fuel rod power, and hence temperature, will decrease as more of the fissile fuel is depleted over the long-term operation of the nuclear reactor. Here a size-varying orifice valve could decrease coolant flow to minimize temperature decreases.

Some ways of changing the size of the fuel assembly's coolant entrance orifice include shutting down the reactor to change the orifice unit with one of different size, or equipping the fuel assembly coolant entrance with an externally controlled valve. A mechanically or electrically actuated valve for each fuel assembly making up the nuclear reactor core would pose serious design and operation problems because of the hostile environment. Also, a self-contained temperature-actuated valve would follow the short-term temperature fluctuations of plant startup, power transients and plant shutdown, and pose time-lag and fail-safe problems.

SUMMARY OF THE INVENTION

It is an object of the invention to provide a nuclear radiation actuated valve.

It is another object of the invention to provide a self-contained nuclear reactor coolant system valve to control coolant flow.

It is an added object of the invention to provide a breeder reactor blanket fuel assembly coolant flow entrance valve to minimize long-term temperature increases due to increases in fissile fuel formed from fertile fuel through breeder reactor operation.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

In one aspect thereof, the valve of the present invention is utilized in a nuclear reactor and is characterized by first and second members arranged in a manner to form an orifice for the passage of a fluid therethrough. The members are formed of materials, respectively, having different nuclear radiation swelling properties whereby exposure to nuclear radiation effects differential swelling and relative movement of said members to vary the size of said orifice.

Several benefits and advantages are derived from the invention. The valve's nuclear radiation actuation feature provides a simple, reliable, and self-contained valve suitable for use in a nuclear reactor core. The invention may be used as the coolant inlet orifice for a fuel assembly where long-term temperature changes are to be minimized without responding to short-term temperature fluctuations. The nuclear radiation actuated valve allows a long-life core fissile fuel assembly not to significantly decrease temperature as fissile fuel is depleted. It also allows a breeder reactor blanket fertile fuel assembly not to drastically increase temperature as fertile fuel is converted into fissile fuel and hence not to degrade the useful material life of the fuel assembly or adjacent reactor vessel internals.

BRIEF DESCRIPTION OF THE DRAWINGS

The accompanying drawing which is incorporated in and forms a part of this specification, illustrates an embodiment of the present invention and, together with a description, serves to explain the principles of the invention. In the drawing.

DETAILED DESCRIPTION OF THE INVENTION

Figure 1:
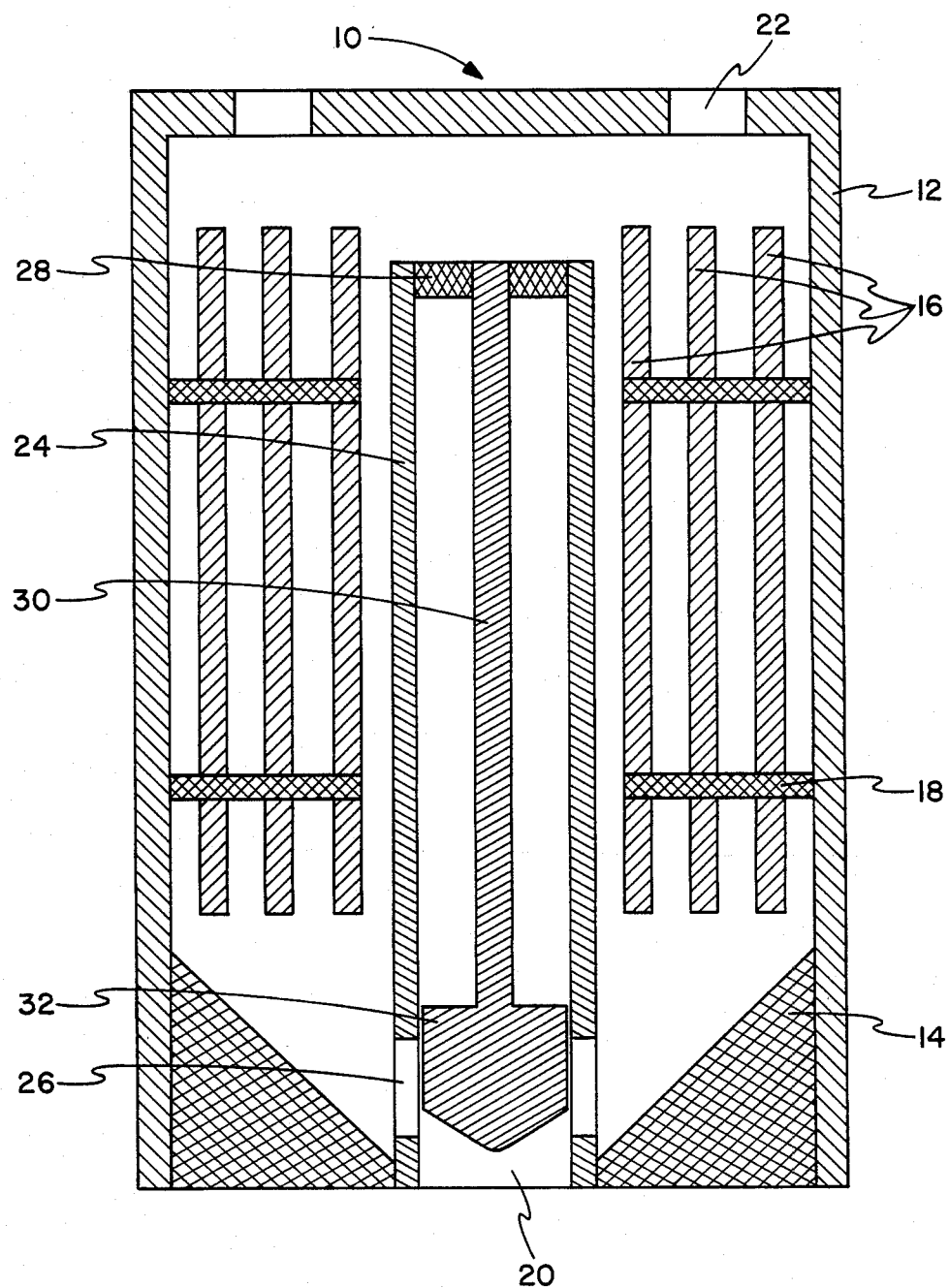
FIG. 1 is a cross-sectional schematic side view of a nuclear reactor fuel assembly which utilizes one embodiment of the nuclear radiation actuated valve of the invention.

Reference will now be made in detail to the present preferred embodiment of the invention, an example of which is illustrated in the accompanying drawing.

The nuclear radiation actuated valve operates upon the principle of nuclear radiation induced swelling. The state-of-the art considers nuclear radiation induced swelling as something to be avoided, as a phenomenon which poses problems with nuclear reactor operations, such as fuel rod integrity, etc. Efforts have been made to develop materials which have minimum swelling. The valve of the invention, on the other hand, recognizes that nuclear radiation induced swelling may be used advantageously in certain nuclear reactor applications.

A simplified nuclear reactor fuel assembly 10 is shown in FIG. 1. Fuel rods 16, having a common axial direction and making up a fuel region, are held by supports 18 and are surrounded by a duct tube 12. The lower end of the duct tube is attached to the shield block 14 which has a coolant flow entrance 20. The top of the duct tube 12 has one or more coolant flow outlets 22.

The nuclear radiation actuated valve has a valve tube 24 whose lower end is attached to the shield block 14 at the coolant flow entrance 20. The valve tube 24 has one or more side slots or openings 26, near its lower end, through which coolant may pass from the coolant flow entrance 20 to the fuel rods 16. The valve tube 24 is positioned within the fuel assembly 10 generally longitudinally with respect to the common axial direction of the fuel rods 16.

The valve also has an elongated valve rod 30 which is located within the fuel assembly 10: to receive nuclear radiation from the fuel rods 16, to be longitudinally arranged with respect to the fuel rods' common axial direction, and to be coaxially positioned within the valve tube 24. The upper end of the valve rod 30 is connected to the upper end of the valve tube 24, and a connecting member 28 may be used for weld compatibility. The lower end of the valve rod 30 is shaped like a piston 32. The piston 32 slideably engages the lower end of the valve tube 24. Before the valve begins operation in a breeder reactor blanket fertile fuel assembly, the piston 32 is positioned, prior to connecting the upper ends of the valve rod 30 and valve tube 24, to cover at least a portion of the valve tube's side slots 26. In a breeder or non-breeder reactor fissile fuel assembly, the piston's initial position would leave the side slots 26 generally uncovered.

The valve orifice is defined by the piston 32 and side slots 26 arrangement and is thereby located in the coolant flow entrance 20 to the fuel assembly 10. Both the valve rod 30 and valve tube 24 have known and different nuclear radiation swelling properties, and from their coaxial arrangement therefore experience different nuclear radiation induced swelling which changes the size of the valve orifice.

For the case of the breeder reactor blanket fertile fuel assembly, the fuel rods have fertile fuel converted to fissile fuel with long-term fuel rod power increases, and hence temperature increases. Here the valve tube 24 is chosen from materials having greater nuclear radiation induced swelling properties than those of the material chosen for the valve rod 30. For example, the valve tube 24 could be made from an alloy having the following nominal weight percent composition: 0.05 carbon, 1.75 manganese, 0.01 sulfur, 0.02 phosphorus, 0.5 silicon, 17.0 chromium, 13.0 nickel, 2.5 molybdenum, 0.02 nitrogen and 65.15 iron; and the valve rod 30 could be made from an alloy having the following nominal weight percent composition: 85.0 iron, 12.0 chromium, 0.5 nickel, 1.0 molybdenum, 0.5 tungsten, 0.3 vanadium, 0.3 silicon, 0.2 manganese, and 0.2 carbon. In operation, nuclear radiation would cause the valve tube 24 to swell, along the common axial direction, to a much greater extent than would the valve rod 30. Since the valve tube's lower end is the only part of the valve attached to the rest of the fuel assembly 10, the net effect is to have the piston 32 move up the lower end of the valve tube 24, which will uncover more of the side slots 26. This, in turn, increases the size of the valve orifice which will increase the coolant flow to the fuel rods as their long-term power increases, to counteract temperature increases.

The in-reactor differential swelling of the valve rod 30 and valve tube 24 is predominately due to nuclear radiation, and not to the reactor's long-term operating temperature increases caused by fuel rod enrichment in a breeder reactor blanket fertile fuel assembly, or temperature decreases caused by fuel rod depletion in a breeder or non-breeder reactor fissile fuel assembly. The amount of swelling in a material is dependent upon its irradiated life (fluence) and average temperature. The coolant flow rate increase (decrease) can be controlled to match the core blanket fuel rod power increase (decrease). Since coolant temperature rise in the fuel assembly is a direct function of fuel rod power and coolant flow rate, the time-temperature variation can be controlled by appropriate material selection and valve sizing. By providing a linear valve side slot 26 area for linear differential swelling alloys and by providing a non-linear valve side slot 26 area for nonlinear differential swelling alloys, coolant flow increase (or decrease) can be linearized with fissile fuel build-up (or depletion) to end of life. Here "linear differential swelling" means swelling which is linear with respect to radiation exposure time, and "linear valve side slot area" means a valve side slot 26 having a shape (such as a rectangle) so that its area changes linearly with respect to axial distance. The differential swelling achievable at a fluence of approximately $2 \times 10^{23}$ neutrons per square centimeter is approximately 1 inch, more than sufficient for an adequate valve stroke. It should also be noted that, in a core blanket assembly, plutonium generated minus that fissioned is essentially linear with respect to power increase. Power increase is linear with respect to the full-power days of operation. This simplifies final design of the valve in a particular application in that the valve can be readily adapted to produce a linear increase in flow rate. In a mathematical study, a theoretical evaluation of a valve based on the principles of the invention was performed. The results showed that a significant temperature reduction would be achieved over the "no valve" case.

For the case of the breeder or non-breeder reactor fissile fuel assembly, the fuel rods have only fissile fuel which, in long-term, will decrease in fuel rod power and hence in temperature. Here the material chosen for the valve tube in the breeder reactor case would be used for the valve rod, and the material chosen for the valve rod in the breeder reactor case would be used for the valve tube. In operation, the differential nuclear radiation induced swelling of the valve rod 30 relative to the valve tube 24 will cause the piston 32 to move down the valve tube's lower end to cover more of the side slots 26. This will decrease the size of the valve orifice which will decrease the coolant flow, as the long-term power decreases, to offset temperature decreases.

In all applications, one must ensure that the valve's piston 32 and the lower end of the valve tube 24 do not swell together from nuclear radiation exposure, but are allowed to remain slideably engageable. One solution is to locate the piston/valve tube engagement area and/or the valve rod and tube upper end connecting member 28 outside of the swelling susceptibility area. Another method is to provide a large piston/valve tube clearance and equip the piston with a compressible ring. An additional technique is to properly choose the valve materials. For example, in the case of the breeder reactor blanket fertile fuel assembly previously discussed, the valve tube 24 was made of an alloy having greater swelling properties than the alloy chosen for the valve rod 30 (including its piston 32 lower end). Since the more rapidly expanding valve tube 24 will have its inside and outside diameters only swell outwards to relieve stress, the slower expanding piston 32 will not lock up. In other valve applications, when necessary, the piston 32 and side slot 26 areas could be made of materials chosen to prevent valve lockup, and these materials may be different from the materials chosen for the rest of the valve rod 30 and valve tube 24 which would be selected to provide differential swelling to change the size of the valve orifice.

The self contained and self actuating valve of the invention is not limited to the arrangement shown in FIG. 1. For example, a valve rod could be connected to the top of the duct tube and extend out the bottom of the fuel assembly through a small opening. The bottom of the valve rod could be attached (through linkage if necessary) to actuate any conventional valve orifice arrangement located to receive different nuclear radiation induced swelling so that a change in orifice size will occur with long-term reactor operation. Differential swelling could even be achieved with valve components having the same swelling characteristics if they were located to receive different nuclear radiation exposure. Also, minimal coolant flow to the fuel assembly 10 can be assured by using a fixed orifice in the shield block 14 separate from the valve of the invention, or by using a valve seat in the valve of the invention so that some valve side slot 26 area is uncovered even when the piston 32 is bottomed out. Additionally, the valve of the invention can be employed to control coolant flow to a region of the reactor consisting of a group of fuel assemblies (this would look like FIG. 1 where each fuel rod 16 of FIG. 1 would be considered to be a separate fuel assembly).

From the above discussion, it is seen that the essence of the nuclear reactor valve of the invention may be described in general terms as requiring: (1) an elongated first member of known nuclear radiation swelling characteristics (such as a valve rod having a piston) positioned to receive radiation from the reactor's fuel region; (2) a second member of known nuclear radiation swelling characteristics (such as a valve tube having side slots); and (3) means or apparatus for positioning the second member to receive nuclear radiation induced swelling different from that of the first member (preferably with a coaxial valve rod and valve tube arrangement using a valve rod and valve tube of different swelling characteristics) and for positioning the two members to create a valve orifice which changes size with the different swelling of the two members (preferably by connecting the upper end of the valve rod to the upper end of the valve tube with the piston slideably engaging the side slots, and by connecting the lower end of the valve tube to a fuel assembly shield block).

In summary, a nuclear radiation actuated valve, for use in a nuclear reactor, may be created by utilizing valve members with known nuclear radiation induced swelling properties to form a valve orifice which changes in size with the differential swelling of the valve members from the reactor's nuclear radiation.

The foregoing description of a preferred embodiment of the invention has been presented for purposes of illustration and description. It is not intended to be exhaustive or to limit the invention in the precise form disclosed, and obviously many modifications and variations are possible in light of the above teaching. The embodiment was chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

We claim:

1. A valve for controlling fluid flow in a nuclear reactor comprising: a tube having an opening in the wall thereof adjacent one end of said tube, a rod coaxially mounted within said tube and having a piston at one end thereof adjacent said opening, said piston adapted to at least partially block said opening to define the effective size thereof, means connecting the other end of said rod to the other end of said tube, said tube and said rod formed of materials, respectively, having different nuclear radiation swelling properties whereby exposure to nuclear radiation during reactor operation causes differential swelling and consequent relative movement between said tube and said rod to displace said piston and vary the effective size of said opening.

2. A valve according to claim 1 in combination with a fuel assembly mounted in said nuclear reactor, said valve located within said fuel assembly for controlling coolant flow through said fuel assembly, said tube fixedly secured at one end thereof to said fuel assembly.

3. A valve according to claim 1 wherein said swelling properties of said tube are greater than the swelling properties of said rod to increase the size of said opening upon differential nuclear radiation swelling between said tube and said rod.

4. A valve according to claim 1 wherein said swelling properties of said rod are greater than the swelling properties of said tube to decrease the size of said opening upon differential nuclear radiation swelling between said rod and said tube.

5. A valve according to claim 1, wherein the material of said rod comprises an alloy whose weight percent composition consists essentially of 0.05 carbon, 1.75 manganese, 0.01 sulfur, 0.02 phosphorus, 0.5 silicon, 17.0 chromium, 13.0 nickel, 2.5 molybdenum, 0.02 nitrogen and 65.15 iron; and said tube includes an alloy whose weight percent composition consists essentially of: 85.0 iron, 12.0 chromium, 0.5 nickel, 1.0 molybdenum, 0.5 tungsten, 0.3 vanadium, 0.3 silicon, 0.2 manganese, and 0.2 carbon.

6. A valve according to claim 2, wherein said swelling properties of said tube are greater than the swelling properties of said rod to increase the size of said opening upon differential nuclear radiation swelling between said tube and said rod.

7. A valve according to claim 2, wherein said swelling properties of said rod are greater than the swelling properties of said tube to decrease the size of said opening upon differential nuclear radiation swelling between said rod and said tube.

8. A valve according to claim 1, wherein the material of said tube comprises an alloy whose weight percent composition consists essentially of 0.05 carbon, 1.75 manganese, 0.01 sulfur, 0.02 phosphorus, 0.5 silicon, 17.0 chromium, 13.0 nickel, 2.5 molybdenum, 0.02 nitrogen and 65.15 iron; and said rod includes an alloy whose weight percent composition consists essentially of: 85.0 iron, 12.0 chromium, 0.5 nickel, 1.0 molybdenum, 0.5 tungsten, 0.3 vanadium, 0.3 silicon, 0.2 manganese, and 0.2 carbon.

* * * * *